Nov. 28, 1950 J. P. SMITH 2,531,831

METHOD OF IMAGE TRANSMISSION

Filed Oct. 29, 1947 3 Sheets-Sheet 1

INVENTOR
John Paul Smith
BY Olin C. Mitchell
ATTORNEY

Nov. 28, 1950 J. P. SMITH 2,531,831

METHOD OF IMAGE TRANSMISSION

Filed Oct. 29, 1947 3 Sheets-Sheet 2

INVENTOR
John Paul Smith
BY [signature]
ATTORNEY

INVENTOR
John Paul Smith
BY [signature]
ATTORNEY

Patented Nov. 28, 1950 2,531,831

UNITED STATES PATENT OFFICE 2,531,831

METHOD OF IMAGE TRANSMISSION

John Paul Smith, Cranbury, N. J., assignor to Radio Corporation of America, a corporation of Delaware Application October 29, 1947, Serial No. 782,804

5 Claims. (Cl. 178—6)

This invention relates to television systems and the like, and more particularly the electrical characterization of moving objects for special effects and inspection.

The successful development of television systems gives rise to requirements of special effects, not only for entertainment purposes, but for object and material inspections wherein electrical devices can more accurately and efficiently perform the required action.

According to this invention, successive recurring intervals of a video signal train are compared and the difference is utilised either in combination with the original video signal or by itself for an indication of object movement. The signal thus derived is employed for providing special effects and for providing signals emphasizing designated object movement.

A primary object of this invention is to provide an improved television system.

Another object of this invention is to provide for special effects in television systems.

Still another object of this invention is to form signals characteristic of certain object movements for inspection purposes and the like.

Other and incidental objects of the invention will be apparent to those skilled in the art from a reading of the following specification and an inspection of the accompanying drawing in which Figure 1 shows in block diagram one form of this invention;

Figure 2 shows by block and circuit diagram another form of this invention, particularly adaptable to inspection devices and the like;

Figures 1, 2:
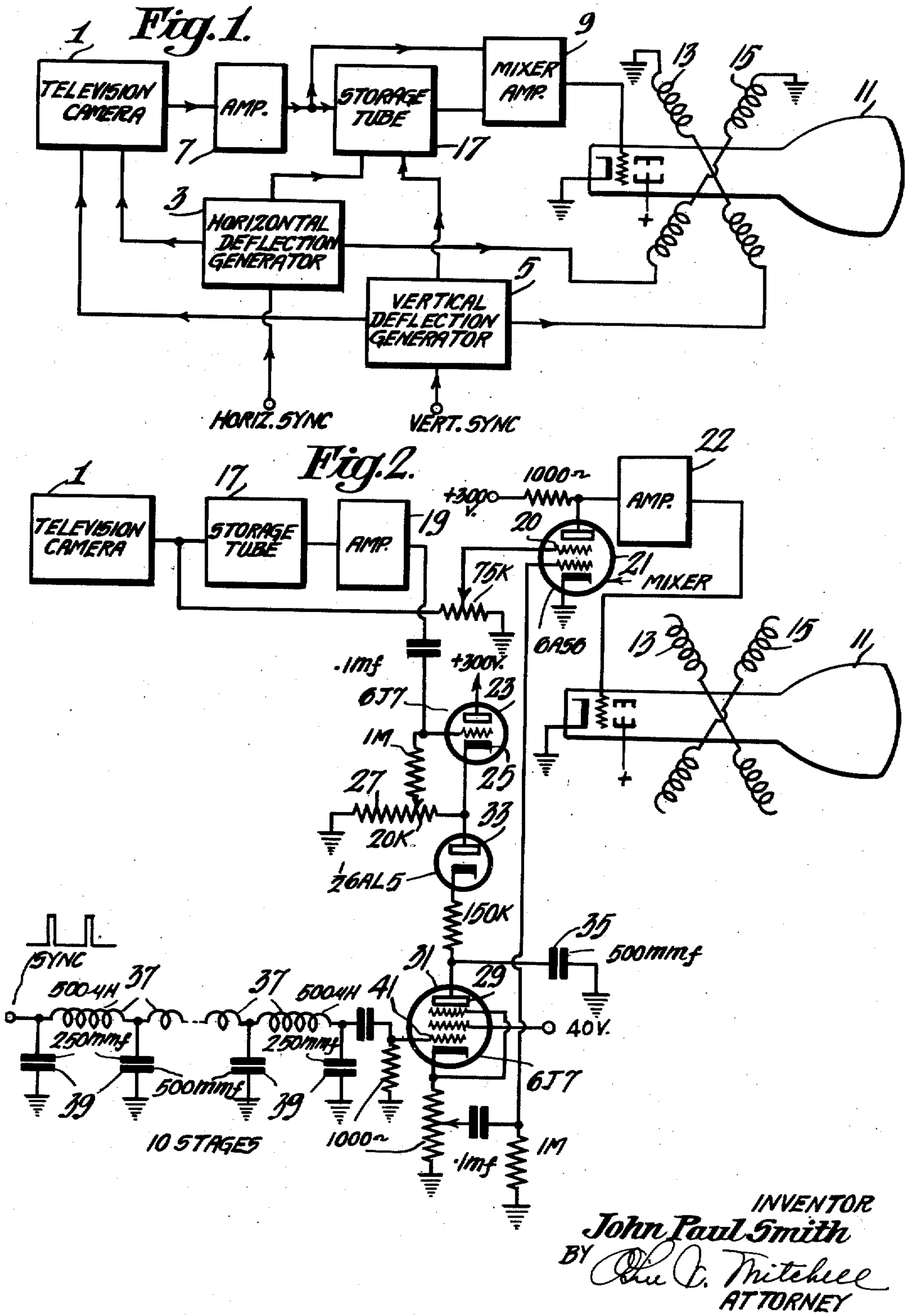

Turning now in more detail to Figure 1, there is shown a television camera 1 which may take any of the well known forms adapted to produce video signals by a scanning operation.

Television camera 1 may, for example, take the form of the popular image orthicon camera which is shown and described in an article entitled "Image Orthicon Camera" by R. D. Kell and G. C. Sziklai, published in "RCA Review" for March, 1946. Suitable associated circuits for the operation of the television camera are shown in detail in the article and in patents and publications referred to throughout the article.

The television camera obtains its required deflection energy from horizontal signal generator 3 and vertical deflection signal generator 5, which are synchronized in the well known manner. A suitable horizontal deflection generator 3 and the vertical deflection generator 5 are shown in detail in Figure 5, and their description and operation will be referred to in more detail below.

Video signals from the television camera 1 are amplified in amplifier 7 which must, of course, be capable of transmitting the wide band signals required in high quality video systems.

The output of amplifier 7 is applied to mixer amplifier 9 to be transmitted to an indicating device 11 which, as illustrated, takes the form of an image reproducing tube or kinescope 11 with associated beam deflection coils 13 and 15.

It will be noticed that the same deflection arrangement is employed for the television camera 1 and the kinescope 11. It is, of course, obvious that separate deflection arrangements may be employed, providing they are suitably synchronized.

Amplifier 7 also supplies video signals to the storage tube 17, whose function is to compare predetermined intervals of the video signal and pass an indication of difference in predetermined recurring intervals of video signal.

For the purpose of illustration of this invention in one of its forms, the deflection in the storage tube 17 is timed with the deflection of the television camera 1 and the kinescope 11. It will thus be seen that the recurring intervals compared in storage tube 17 are equivalent in time duration to the scanning intervals employed in the system.

Storage tube 17 may take the form of the commercial type SDT–0. Although the description and operation of storage tubes are known to the art, a detailed showing and description thereof is given below in connection with Figure 3 of the drawing.

The mixer amplifier 9 is provided in order that the signal applied to the kinescope 11 may be not only that signal obtained from the storage tube 17, but may be a desired combination of both the original video signal and the signal derived from the storage tube 17 indicating the difference in video signal between each successive scanning of the image of the object. In this manner, many desirable effects can be obtained in the reproduced image, such as, for example, the accentuation of movement.

Turning now to Figure 2, there is shown a television camera 1 followed by a storage tube 17. The output signal from the storage tube 17 is applied to amplifier 19.

The output signal of the television camera 1 is also applied to a control electrode 20 of tube 21. The output of tube 21 is connected to an amplifier 22 feeding an indicating device such as a kinescope 11.

The output signal of the amplifier 19 is applied to tube 23, whose output is taken from the cathode 25. The output voltage of tube 23 is developed across a cathode resistor 27 and applied to the anode 29 of tube 31 through a diode 33.

Tubes 23 and 33 are arranged to charge condenser 35 in an amount dependent upon the output of amplifier 19. It will be seen that an alternating current signal applied to tube 23 is rectified in diode 33 to charge condenser 35. Although a cathode output is employed in tube 23 in order to obtain a lower impedance source for the diode 33, the output could have, of course, been taken from the anode circuit of tube 23.

Tube 31 is employed to discharge condenser 35 upon the application to tube 31 of a synchronizing pulse delayed through a delay network including inductances 37 and condensers 39. The purpose for the delayed synchronizing pulse in actuating tube 31 is to discharge condenser 35 only at the beginning of each scanning line. It will be seen, however, that if no signal was passed by storage tube 17 by reason of no movement occurring in any one scanning line, there will be no alternating current applied to diode 33, and hence no charge on condenser 35. Although the tube 31 is made conductive at the beginning of each scanning line, unless condenser 35 has received a charge, no signal will occur in the cathode circuit of tube 31 to be applied to mixer tube 21.

However, if, as a result of movement picked up by television camera 1 and detected by storage tube 17, a rectified alternating current voltage is applied to condenser 35 during the scanning line, at the beginning of the succeeding line the delayed synchronizing pulse applied to the control electrode 41 of tube 31 will cause a signal to be transmitted through the cathode circuit of tube 31 to the mixer tube 21.

Figure 3:
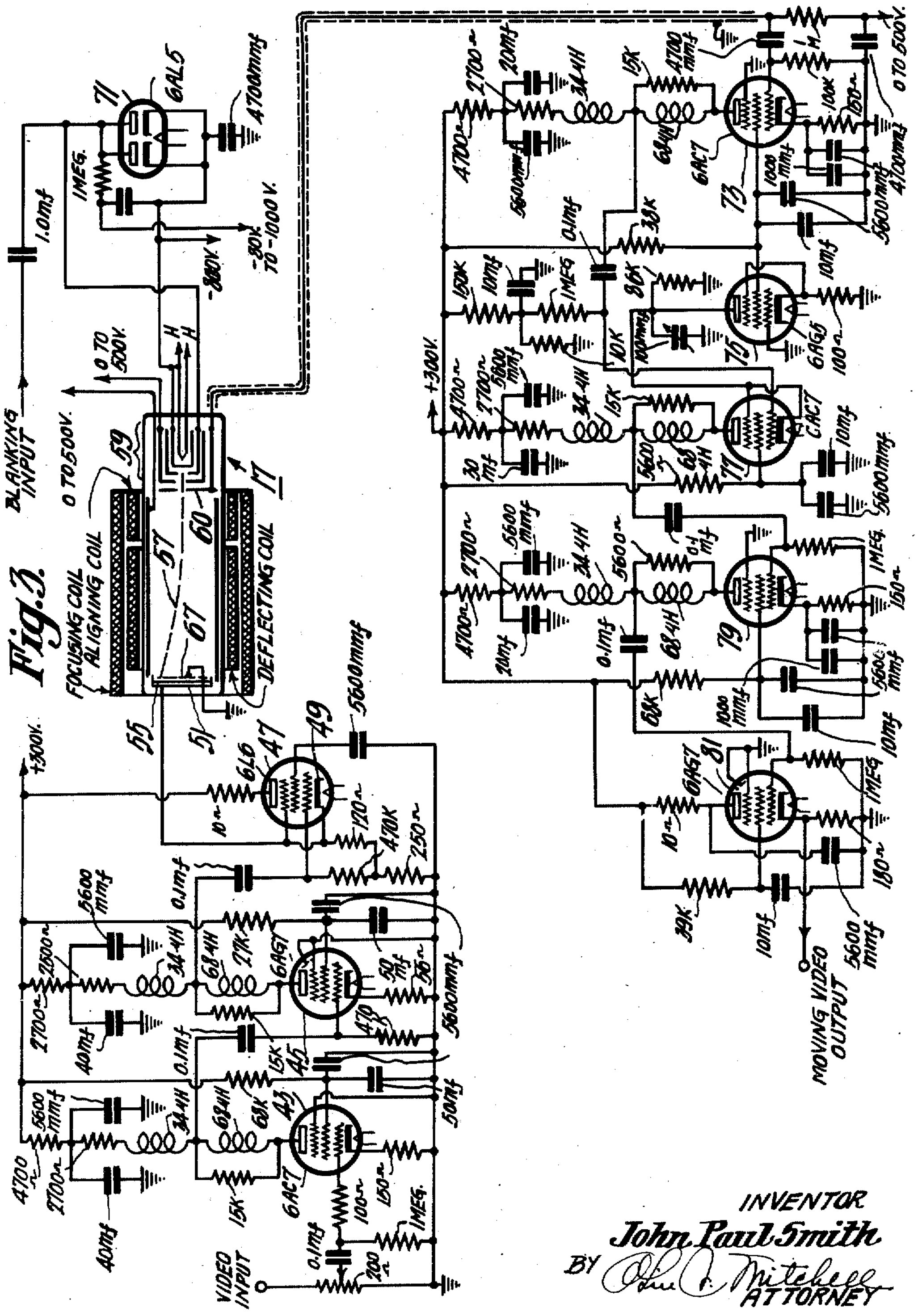
Figure 3 shows by circuit diagram a detailed circuit arrangement suitable for employment in the practice of this invention.

Turning now to Figure 3, there is shown in circuit diagram one form of this invention involving an amplifier having several stages, including tubes 43, 45 and 47. The operation of such an amplifier needs no detailed description here except, perhaps, to call attention to the typical values for resistances, inductances and condensers that are given in the drawing by way of example. Any suitable values of resistances, capacities and inductances are satisfactory, providing they are so chosen to pass the wide frequency band necessary in the transmission of video signals. It is also necessary that the amplifier furnishing signals to the storage tube 17 of Figure 3 be of sufficient power to properly operate storage tube 17. Video signals from a television camera or a video channel are applied to the terminal at the left of the amplifier, and the output of the amplifier which is taken from the cathode 49 of tube 47 is applied to the signal plate 51 of storage tube 17.

Although the detailed operation of storage tube 17 is known to the art, it may be well here to briefly review its operation in order to insure complete understanding of the operation of the present invention.

The storage tube type STE employs electrostatic deflection and may be used in the practice of this invention without departing from the spirit thereof.

The storage tube type SDT-5 is a storage tube of the electromagnetic deflection type which may be satisfactorily employed. It is well shown and described in the copending U. S. application of Richard E. Snyder, Jr., entitled "Electron Tubes," Serial No. 606,812, filed June 24, 1945.

The storage tube 17 referred to immediately above and employed here by way of example records electrical signals from the output tube 47 in the form of charges distributed over a dielectric surface 55 and reproduces the record by removing the charges with an electron beam 57 generated in an electron gun 59 directed at the dielectric surface 55. Charges of either polarity may be stored. Negative charges are caused by the deposition of primary beam electrons and positive charges are caused by the extraction of secondary electrons resulting from the impact of the electrons of the beam 57. Reproduction of the stored signals is accomplished by the same mechanism as that used in recording, but is carried out with no signal input. The beam from the electron gun operates at constant current, except when it is blanked during blanking or standby period. The number of secondary electrons generated by the beam on striking the dielectric surface 55 fluctuates in a manner dependent upon the deposited charge. This secondary electron current flow is naturally of low intensity and represents by its variations the output signals of the device.

The dielectric surface 55, which forms the target for the electron beam 57, is one side of a thin insulated layer, which is mounted with its other side in intimate contact with a conducting plate 51. Over the exposed surface 55 is stretched a fine metal screen 67, which has a high void-to-land ratio.

In operation, the electron beam 57 strikes the dielectric surface 55 with sufficient velocity to produce a secondary emission ratio greater than unity. To obtain this condition, the cathode of the electron gun 59 is maintained at a potential about 800 volts negative relative to the target screen 67, which is usually held at ground potential. With this arrangement, wherever the beam 57 strikes the dielectric 55, the potential of the elemental area of the surface under bombardment becomes the same or nearly the same as that of the screen 67, that is, equilibrium conditions exist only at this potential.

If an elemental area of the dielectric surface 55 is negative relative to the screen 67, a positive field is presented to the surface 55, and therefore all of the secondary electrons released by the impact of the beam electrons of beam 57 are drawn away by the screen 67. Since the number of secondary electrons is greater than the number of primary electrons, there is a net loss of negative charge, and the surface becomes more positive. If, however, an elemental element of surface 55 is positive with respect to the screen 67 at the time of bambardment, a negative field is presented to the surface 55 and secondary emission is suppressed. Since no secondary electrons leave the elemental area of the dielectric surface 55, there is a net gain of negative charge and the potential of the surface changes in a negative direction.

At the potential of the screen 67 or a little positive thereto, the two effects balance. Just enough of the secondaries leave the surface to neutralize the arriving primaries. This condition of unity secondary emission equilibrium probably exists at a potential a few volts positive with respect to the screen 67 because the initial velocity of most of the secondary electrons is sufficient to lift them over a 2 to 4 volt barrier. The exact potential is not very definite because it is affected by space charge conditions and the geometry of the screen 67 and nearby electrodes. The value of the equilibrium potential has substantially no influence on the operation of the tube as long as it remains substantially constant.

In the normal operation of storage tube 17, the screen 67 is grounded or maintained at a D.-C. potential, and the conductor 51 on the back of the dielectric is connected to the source of signal to be recorded, which in this form of the invention is obtained from tube 47. The insulating surface is therefore capacity coupled to the signal plate, and also has capacity to the grounded screen 67. When the signal voltage is impressed upon the signal plate 51, it also appears somewhat diminished in amplitude on the recording surface 55.

If, then, the beam 57 is deflected across the surface 55 while a signal is impressed on the signal plate 51, it will cause each element it strikes on surface 55 to come to the potential of screen 67 regardless of the potential the surface would otherwise have due to the influence of the signal plate. This action then establishes a charge between the signal plate 51 and the surface element on the surface 55, which will cause the element to have a potential different from that of the screen 67 when the beam moves elsewhere and the signal plate 51 returns to zero potential. If the beam scans a long path over the target 55 while a fluctuating voltage is impressed on the signal plate 51, a band of charges as wide as the beam 57 will remain on the path when the beam is cut off or traverses elsewhere on the target 55.

If the signal plate 51 returns to zero potential, the potential along the scanning path on target 55 will vary in proportion to the signal voltage impressed during the beam transit. It will, of course, be smaller than the impressed voltage and its polarity will be reversed. When the target 55 is scanned by the electron beam 57, a stream of secondary electrons is released from target 55. Some of the secondaries are released from the solid parts of the screen 67 which intercepts some of the beam current; the rest come from the surface of the dielectric 55. Although the secondary emission ratio of the screen 67 is constant, the secondary emission from the dielectric surface fluctuates according to the previously assumed charge of the scanned elemental area. If a negative charge is to be supplied, secondary emission ceases until the demand has been satisfied. If a positive charge is needed, the secondary emission is at maximum until the full charge is achieved.

Since the fluctuations of the secondary electrons constitute the output of the tube 17, such an output exists during the recording operation. This output is in the same phase as the input signal because a positive signal causes the dielectric to absorb electrons, thereby reducing the current to the collector electrode 60 and allowing it to go positive, while a negative signal makes the dielectric give up electrons, increasing the current to the collector electrode 60 to make it go negative.

From the discussion of the recording and reproducing processes, it is evident that an output is derived when and only when the charge on the surface element is changed. By repeatedly scanning the same pattern on the target while successive sets of signals are impressed on the signal plate, an output from tube 17 is obtained during scanning, in which only differences between successive signal trains appear.

In any scanning operation, it is necessary that the electron beam be extinguished during retrace time intervals. In the circuit diagram shown in Figure 3, this is accomplished by applying a blanking input signal 9 to tube 71 and its associated circuit elements. The output signal from the collector electrode 60 of tube 17 is applied to another amplifier consisting of the tubes 73, 75, 77, 79 and 81, at the bottom of Figure 3.

It will be seen, also, that the amplifier involving tubes 73—81 is also designed to pass a wide band frequency. Any suitable amplifier may be substituted therefor without departing from the spirit of this invention.

The signal obtained from the output of the amplifier involving tubes 73—81 is only representative of the changes in the video signal from one scanning operation to the next succeeding scanning operation. This signal may be designated as the moving video signal and may be employed in the manner illustrated in Figures 1 and 2.

Figure 4:
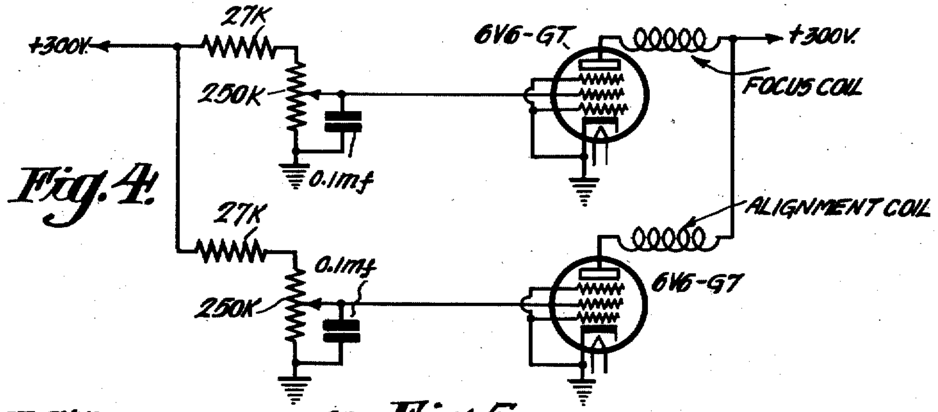
Figure 4 shows by circuit diagram a suitable arrangement for providing energy for the focusing coil and aligning coil of the storage tube employed in the practice of this invention.

Turning now to Figure 4, there is shown a circuit arrangement for providing energy for the focusing coil and aligning coil of the storage tube. The focus coil and alignment coil are illustrated by inductances appropriately labeled.

Figure 5:
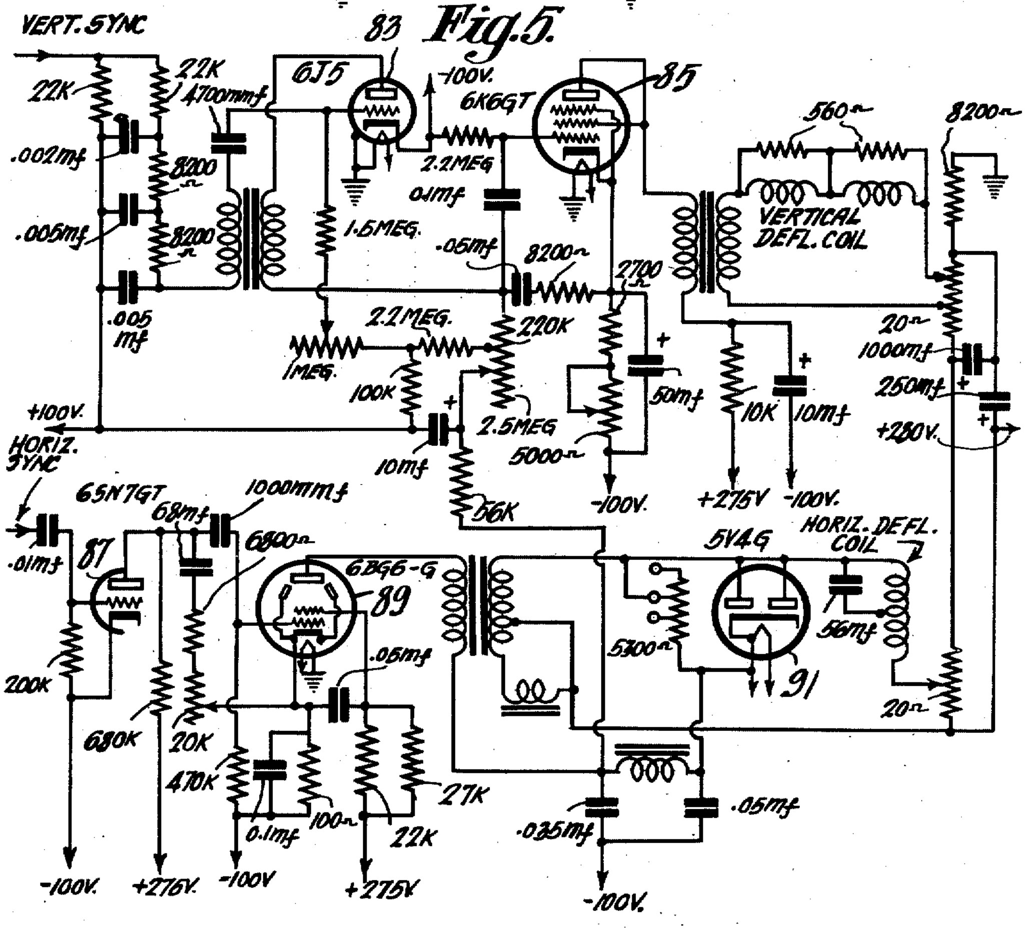
Figure 5 shows by circuit diagram a suitable cathode ray beam deflection circuit arrangement.

The circuit diagram shown in Figure 5 is a suitable electron beam deflection arrangement to provide for the complete scanning operation of both horizontal and vertical deflection. The deflection coils indicated in the drawing and designated as such are those which may be employed in the beam deflection in the television camera 1, the kinescope 11 and the storage tube 17 through the several figures of the drawing.

Vertical synchronizing impulses are applied to the upper portion of the circuit diagram of Figure 5, including tubes 83 and 85, to synchronize the vertical deflection and likewise the horizontal sync, as applied to the lower section of the circuit diagram of Figure 5 involving tubes 87, 89 and 91.

The operation of the deflection circuit shown in Figure 5 is quite well known in the art and is used commercially in presently marketed television receivers, such as commercial model 630TS, shown and described in detail in the "RCA Review" for March, 1947, pages 5–28.

Tube types and circuit constants have been given throughout the drawings for the purpose of illustration, and it is not intended that this invention should be limited thereto. Any suitable values and tube types may be employed without departing from the spirit of this invention. Like numbers throughout the drawing indicate similar pieces of equipment. It is, of course, obvious to one skilled in the art that various types of indicating devices and video signal generators may be employed.

Having thus described the invention, what is claimed is:

1. A method for the electrical transfer of image information comprising the steps of developing a video signal representative of a repeating scanning process, dividing said video signal into equal intervals representative of complete scanning rasters, comparing sequential intervals of said video signals, developing from said comparison an image element to image element difference signal, and combining said difference signal with said video signal.

2. A method for the electrical transfer of image information comprising the steps of developing a video signal representative of a repeating scanning process, dividing said video signal into intervals representative of complete scanning rasters, comparing intervals of said video signals, developing from said comparison an image element to image element difference signal, and combining said difference signal with said video signal.

3. A method for the electrical transfer of image information comprising the steps of developing a video signal representative of a repeating scanning process, dividing said video signal into equal intervals representative of complete scanning rasters, comparing sequential intervals of said video signals, developing from said comparison an image element to image element difference signal, electrically integrating said difference signal, developing a signal pulse at each of said intervals, representing in pulse amplitude the integrated difference signal, and combining said signal pulse with said video signal.

4. A method for the electrical transfer of image information comprising the steps of developing a video signal representative of a repeating scanning process, dividing said video signal into equal intervals representative of complete scanning rasters, comparing sequential intervals of said video signals, developing from said comparison an image element to image element difference signal, electrically integrating said difference signal, and developing a signal pulse recurring at the same relative position in each of said intervals representing in pulse amplitude the integrated difference signal.

5. A method for the electrical transfer of image information comprising the steps of developing a video signal representative of a repeating scanning process, dividing said video signal into equal intervals representative of complete scanning rasters, comparing sequential intervals of said video signals, developing from said comparison an image element to image element difference signal, electrically integrating said difference signal, developing a signal pulse recurring at the same relative position in each of said intervals representing in pulse amplitude the integrated difference signal, combining said signal pulse with said video signal, and developing an indication with said combination.

JOHN PAUL SMITH.

REFERENCES CITED

The following references are of record in the file of this patent:

UNITED STATES PATENTS

| Number | Name | Date |
|---|---|---|
| 1,796,030 | Kell | Mar. 10, 1931 |
| 2,000,694 | Felix | May 7, 1935 |
| 2,058,883 | Ives | Oct. 27, 1936 |
| 2,073,370 | Goldsmith | Mar. 9, 1937 |
| 2,202,605 | Schroter | May 28, 1940 |
| 2,227,630 | Carnahan | Jan. 7, 1941 |
| 2,321,611 | Moynihan | June 15, 1943 |
| 2,403,975 | Graham | July 16, 1946 |
| 2,451,640 | Thalner | Oct. 19, 1948 |